United States Patent Office 2,833,792
Patented May 6, 1958

2,833,792

1,3,17-TRIOXYGENATED ANDROSTANE DERIVATIVES

Raymond M. Dodson, Park Ridge, Arthur H. Goldkamp, Deerfield, and Raphael Pappo, Skokie, Ill., assignors to G. D. Searle & Co., Chicago, Ill., a corporation of Delaware No Drawing. Application August 2, 1957
Serial No. 675,808

7 Claims. (Cl. 260—397.4)

The present invention relates to 1,3,17-trioxygenated androstane derivatives. The compounds of this invention can be represented by the general structural formula

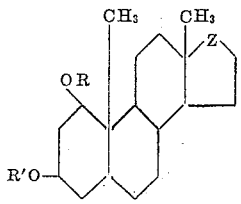

In this formula R and R' can each represent hydrogen or an acyl radical. Among the acyl radicals which R and R' can represent are particularly the acyl radicals of hydrocarbon carboxylic acids containing fewer than nine carbon atoms, and the acyl radicals of hydrocarbon sulfonic acids containing fewer than nine carbon atoms. Examples of such acyl groups are formyl, acetyl, propionyl, butyryl, valeryl, hexanoyl, heptanoyl, octanoyl, cyclohexanecarbonyl, cyclohexaneacetyl, cyclopentanepropionyl, benzoyl, phenylacetyl, methanesulfonyl, ethanesulfonyl, benzenesulfonyl, toluenesulfonyl, and isomers and homologs of the foregoing. In the foregoing structural formula the term Z can represent the carbonyl group (CO), the hydroxymethylene group (CHOH), a group of the formula CHO-Acyl wherein the acyl radical can be selected from among the class of acyl radicals previously defined, or a group of the formula

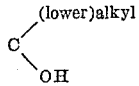

wherein the alkyl radical is a straight- or branched-chain alkyl radical containing fewer than nine carbon atoms.

A suitable starting material for the manufacture of compounds of this invention is 1,3-dihydroxy-5-androsten-17-one (1-hydroxydehydroisoandrosterone) which can be obtained, as described in copending application Serial No. 624,958, filed November 29, 1956, by subjecting dehydroisoandrosterone, under controlled conditions, to the oxygenating activity of a particular Penicillium organism isolated from a sample of Illinois soil. A culture of this microorganism has been deposited with the American Type Culture Collection, Washington, D. C., and has been designated as Penicillium sp., Accession No. 12,556. This organism is sometimes referred to hereinafter as ATCC 12,556.

Other useful starting materials for the manufacture of compounds of this invention are esters of 1,3-dihydroxy-5-androsten-17-one, as well as various stereoisomeric 5-androstene-1,3,17-triols and esters thereof.

Hydrogenation of such a 1,3,17-trioxygenated-5-androstene derivative in the presence of a noble metal hydrogenation catalyst such as one comprising platinum or palladium results in the saturation of the nuclear double bond and the formation of a corresponding androstane derivative.

Free hydroxyl groups present in the hydrogenated material can, if desired, be esterified by such means as treating the hydroxylic compound in pyridine solution with a suitable acylating agent. Such suitable acylating agents can be selected from among the anhydrides and acid chlorides of hydrocarbon carboxylic acids and hydrocarbon sulfonic acids.

As differential rates of esterification are exhibited by hydroxyl groups at positions 1, 3, and 17, there can conveniently be obtained either partially esterified or completely esterified derivatives. For example, a 3β-hydroxyl group is esterified at a substantially more rapid rate than a 1α-hydroxyl group; and when a 1α,3β-diol is subjected to reaction with acetic anhydride in pyridine solution at room temperature, the 3-monoacetate is present in good yield after reaction times of from 1-4 hours, while the 1,3-diacetate is present in good yield after reaction times of about 72 hours.

By oxidizing hydroxylic compounds of this invention to the corresponding ketones, and subjecting such ketones to stereoselective reducing processes, the various stereochemical modifications of the 1,3,17-trioxygenated derivatives of this invention can be obtained. Illustrative of this procedure is the reaction sequence, described more fully in the examples to follow, which comprises the oxidation of 1α-hydroxy-3β-acetoxy-5-androsten-17-one to 3β-acetoxy-5-androstene-1,17-dione, reduction with lithium aluminum hydride to yield a reaction mixture from which 5-androstene-1β,3β,17β-triol is isolated, and catalytic hydrogenation to androstane-1β,3β,17β-triol. In carrying out such a sequence, it is satisfactory that the double bond at position 5 be hydrogenated either prior to or subsequent to the chemical operations at position 1.

17-alkyl derivatives encompassed within this invention can be prepared by the reaction of a 17-oxoandrostane derivative with an organometallic reagent. For example, reaction of 1α,3β-dihydroxyandrostan-17-one with an alkylmagnesium halide, followed by hydrolysis of the primary reaction product, affords principally a 17-alkylandrostane-1α,3β,17β-triol. The same compound is obtained by catalytic hydrogenation of the corresponding 17-alkyl-5-androstene-1α,3β,17β-triol.

The androstane derivatives of this invention have useful pharmacological properties, as illustrated by their effects upon the central nervous system. Thus, they are barbiturate potentiators, as their administration causes a prolongation of the sleeping period induced by hexobarbital. In addition, they display toxicity toward certain lower forms of life, and can be employed as anti-fungal agents. Thus, they are effective by topical application in inhibiting the growth of *Trichophyton mentagrophytes*.

The 17-oxoandrostane compounds afford pharmacologically-useful 17-ethynyl-17-hydroxy derivatives by reaction with acetylene in the presence of a condensation catalyst such as potassium tertiary amylate.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials, except as otherwise noted, in parts by weight.

*Example 1*

A stainless steel fermentation tank having a capacity of about 40 liters is charged with a solution of 1000 grams of dextrose, 200 grams of a cottonseed protein concentrate, 90 milliliters of corn steep liquor and 12 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of about 110–115° C. and a final volume of about 30 liters. After cooling, an inoculation is made with a spore suspension of Penicillium sp., ATCC 12,556, and the contents of the fermentor are kept in agitation by a stirrer operating at about 200 revolutions per minute. A stream of air which has been sterilized by filtration through a glass wool filter is introduced through an inlet tube into the fermentor at a rate of about 10 liters per minute. This rate of aeration is measured by means of a rotameter placed in the sterile portion of the air line. Growth of the organism is allowed to continue for 24 hours at about 25° C., during which time additional small quantities of anti-foaming agent are added if required. At this point about 20 liters of the culture is conducted by means of a sterile hose connection into a second stainless steel fermentation tank, which has a capacity of about 400 liters and which has previously been charged with about 255 liters of a sterilized and cooled aqueous solution of 1200 milliliters of corn steep liquor and 408 grams of monobasic potassium phosphate, $KH_2PO_4$. The contents of this fermentor are kept agitated by a stirrer operating at about 150 revolutions per minute and by the introduction of a stream of sterile air at a rate of about 30 liters per minute. Growth of the organism is allowed to proceed in this fermentor for an additional 24 hours, after which time there is added a solution of 75 grams of dehydroisoandrosterone in 1500 milliliters of acetone. Fermentation in the presence of the steroid substrate is continued for an additional 20 hours at 25° C., with the same rates of stirring and aeration. Diatomaceous earth is then added, and the mycelium is separated by centrifugation. The mycelium is stirred with 18 liters of methylene chloride, and the aqueous broth collected in the centrifugation of the mycelium is extracted with a total of 200 liters of methylene chloride in two equal portions. The combined methylene chloride solutions are concentrated by distillation under reduced pressure to a suspension having a small volume, and the suspension is then evaporated to dryness. The non-volatile residue is extracted with 200 milliliters of boiling ether. Following this operation, which serves to remove certain ether-soluble impurities, a solid or semisolid product amounting to about 25 grams is collected on a filter. Upon crystallization of this crude product from a mixture of pyridine and ether and then from aqueous pyridine there is obtained purified 1α,3β-dihydroxy-5-androsten-17-one (1α-hydroxydehydroisoandrosterone) which melts at about 288–290° C. after prior softening and has a specific rotation of about +10.6° in chloroform solution. The structural formula is

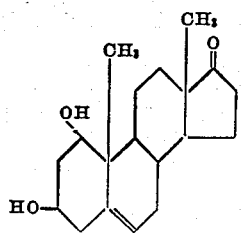

The combined crystallization liquors are concentrated to dryness, and a benzene solution of the non-volatile residue is applied to a silica gel chromatography column containing a quantity of silica equal to 80 times the weight of the crystallization liquor residues. By elution of the column with mixtures of benzene and ethyl acetate containing gradually increasing proportions of ethyl acetate, there are obtained an additional quantity of 1α,3β-dihydroxy-5-androsten-17-one, and a quantity of 1α-hydroxy-4-androstene-3,17-dione. The latter compound is obtained at a satisfactory rate by elution with a 30–40 volume percent solution of ethyl acetate in benzene, and the former compound is obtained at a satisfactory rate by elution with a 50–70 volume percent solution of ethyl acetate in benzene.

*Example 2*

A suspension of 50 parts of 1α,3β-dihydroxy-5-androsten-17-one and 5 parts of 5% palladium on charcoal catalyst in 600 parts of ethanol is shaken in contact with a hydrogen atmosphere, with additional portions of catalyst if required, for from 24 to 48 hours, or until a quantity of hydrogen at least approximately equal to one molecular equivalent (in this example about 0.33 part) has been absorbed. The reaction mixture is filtered, and the filtrate is brought to dryness by vaporization of the ethanol. Purification of the residue by recrystallization from a mixture of methanol and benzene affords 1α,3β-dihydroxyandrostan-17-one melting at about 202–203.5° C. This compound exhibits a specific rotation of about +88° in chloroform solution. The structural formula is

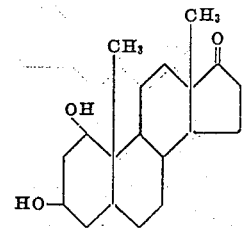

The same 1α,3β-dihydroxyandrostan-17-one is also obtained by the fermentation of 3β-hydroxyandrostan-17-one according to the method of Example 1.

*Example 3*

A solution of 5 parts of 1α,3β-dihydroxyandrostan-17-one in 30 parts of pyridine and 20 parts of acetic anhydride is maintained at about 90–100° C. for 3 hours and then at about 25° C. for an additional 20 hours, following which it is poured, with stirring, into several times its volume of ice water. The insoluble product is collected on a filter and dried. Upon crystallization from a mixture of methylene chloride and ether the product obtained is 1α,3β-diacetoxyandrostan-17-one melting at about 244–246.5° C. The specific rotation of this compound in chloroform solution is about +77°. The structural formula is

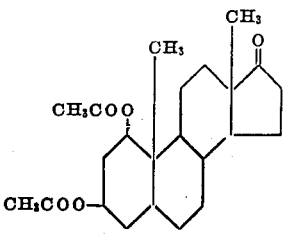

*Example 4*

A solution of 1 part of 1α,3β-dihydroxy-5-androsten-17-one in 20 parts of warm pyridine is cooled to room temperature and treated with 10 parts of acetic anhydride. The reaction mixture is allowed to stand at about 25° C. for 1 hour and then filtered from a small quantity of insoluble residue. The filtrate is stirred with several times its volume of ice, until the ice melts and separation of the insoluble product is complete. This product is collected on a filter and purified by crystallizations from mixtures of acetone and ether or mixtures of acetone and cyclohexane. In this manner there is obtained 1α-hydroxy-3β-acetoxy-5-androsten-17-one which melts at about 243–244° C. and has a specific rotation of about −6.7° in chloroform solution. This compound can also be purified by chromatography on a silica gel column, by elution with mixtures of benzene and ethyl acetate containing gradually increasing proportions of ethyl acetate. The desired compound is eluted at a satisfactory rate with a 20 volume percent solution of ethyl acetate in benzene. The structural formula is

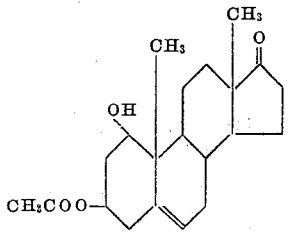

*Example 5*

A solution of 1 part of 1α,3β-dihydroxy-5-androsten-17-one in 20 parts of warm pyridine is cooled to room temperature and treated with 10 parts of acetic anhydride. The reaction mixture is allowed to stand at about 25° C. for 72 hours, after which it is stirred with several times its volume of ice until all of the ice has melted and precipitation of the insoluble product is complete. This product is collected on a filter and then crystallized a few times from methanol and from acetone. The purified compound, 1α,3β-diacetoxy-5-androsten-17-one, melts at about 226–227° C. and has a specific rotation of about +25° in chloroform solution. This compound can also be purified by fractionation of the crude product on a silica gel chromatography column, by eluting the column with mixtures of benzene and ethyl acetate containing gradually increasing proportions of ethyl acetate. The desired compound is eluted from the column at a satisfactory rate with a 5 volume percent solution of ethyl acetate in benzene. The structural formula is

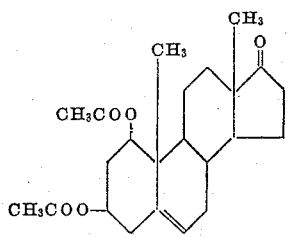

*Example 6*

Hydrogenation of 1α-hydroxy-3β-acetoxy-5-androsten-17-one according to the procedure of Example 2 affords 1α-hydroxy-3β-acetoxyandrostan-17-one. This compound exhibits infrared absorption maxima at about 2.83, 5.75, and 8.08 microns, and has the structural formula

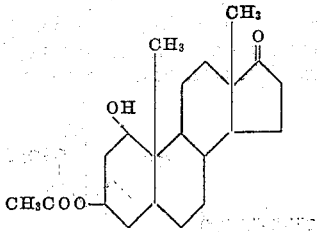

*Example 7*

1α,3β-diacetoxy-5-androsten-17-one is hydrogenated according to the procedure of Example 2. The compound obtained is 1α,3β-diacetoxyandrostan-17-one, identical with the product of Example 3.

*Example 8*

A solution of 4 parts of 1α,3β-dihydroxyandrostan-17-one and 4 parts of p-toluenesulfonyl chloride in 50 parts of pyridine is permitted to stand at about 25° C. for 2 hours. The mixture is poured into several times its volume of ice water, and the insoluble product is collected on a filter, dried, and crystallized twice from mixtures of ether and petroleum ether. The compound obtained is 1α-hydroxy-3β - (p-toluenesulfonoxy)androstan - 17 - one which melts with decomposition at about 150° C. The structural formula is

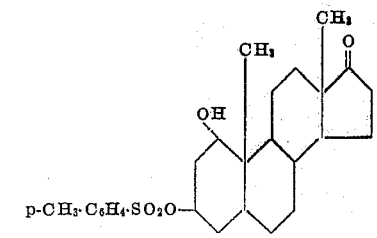

By the foregoing procedure, with the substitution of 4 parts of 2,4-dimethylbenzenesulfonyl chloride for the p-toluenesulfonyl chloride, the compound obtained is 1α-hydroxy-3β - (2,4 - dimethylbenzenesulfonoxy)androstan-17-one.

*Example 9*

Two parts of 1α,3β-dihydroxyandrostan-17-one is dissolved in 45 parts of warm pyridine. The solution is cooled to room temperature and treated with 6 parts of methanesulfonyl chloride. The reaction mixture is allowed to stand at about 25° C. for 72 hours. It is then poured into several times its volume of ice water, and the insoluble product is collected and washed with water. It is 1α,3β-dimethanesulfonoxyandrostan-17-one, which exhibits prominent infrared absorption maxima at about 5.76, 7.53, and 8.50 microns. The structural formula is

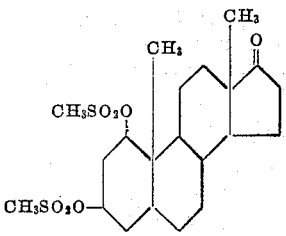

*Example 10*

To a mixture of 5 parts of 1α,3β-dihydroxyandrostan-17-one in 80 parts of ethanol is added a solution of 2 parts of sodium borohydride in 20 parts of water and 80 parts of ethanol. The reaction mixture is allowed to stand at room temperature for 1 and ½ hours, and is then heated under reflux for 5 minutes to insure completion of the reaction. The mixture is poured into ice water and acidified with dilute hydrochloric acid. It is then refrigerated to cause complete separation of product. The insoluble product is collected on a filter and washed with water. It is androstane-1α,3β,17β-triol which melts at about 238–239° C. and has a specific rotation of about +20° in chloroform solution. The structural formula is

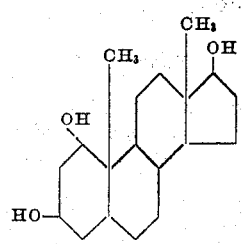

*Example 11*

To a solution of 3.35 parts of chromium trioxide in 20 parts of pyridine is added a solution of 3.2 parts of 1α-hydroxy-3β-acetoxy-5-androsten-17-one in 30 parts of pyridine. The reaction mixture is stirred at about 35°

C. for 4 hours, after which it is poured into several times its volume of ether and washed repeatedly with small portions of water. The ethereal solution is rendered anhydrous, filtered, and concentrated to a small volume by distillation under reduced pressure. Upon dilution with petroleum ether, crystallization is induced. When separation of the crystalline product is complete, it is collected on a filter and washed with petroleum ether. Traces of pyridine are removed by drying under high vacuum or by further crystallizations from mixtures of ether and petroleum ether. This compound is 3β-acetoxy-5-androstene-1,17-dione melting at about 156–159° C. The structural formula is

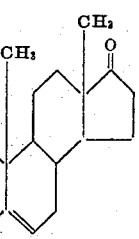

*Example 12*

Over a period of about 30 minutes a solution of 4 parts of 3β-acetoxy-5-androstene-1,17-dione in 570 parts of anhydrous ether is added to a solution of 7 parts of lithium aluminum hydride in 1100 parts of refluxing anhydrous ether. Heating under reflux is continued for an additional 2 hours, after which acetone and water are added to decompose the unreacted lithium aluminum hydride. The reaction mixture is diluted with an equal volume of ether and washed twice with saturated ammonium chloride solution and twice with water. The ethereal solution is made anhydrous and brought to dryness by distillation. The residue consists of a mixture of a 1β-hydroxy compound with the 1α-hydroxy epimer. To obtain a more highly purified 1β-hydroxy compound, the residue is crystallized from mixtures of methanol and benzene and then from mixtures of methanol and chloroform. This compound, 5-androstene-1β,3β,17β-triol, exhibits a variable melting point depending upon the rate of heating. On a melting point block preheated to about 270° C., it melts with slight decomposition at about 274–278° C.; whereas it melts over a broader and lower range when it is heated from room temperature. The specific rotation is about —39.8° in chloroform solution. The structural formula is

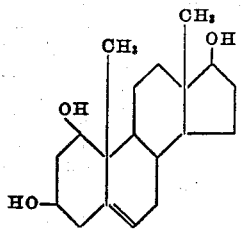

*Example 13*

To a solution of 12 parts of 5-androstene-1β,3β,17β-triol in 3200 parts of ethanol containing 100 parts of concentrated hydrochloric acid is added under nitrogen 2 parts of Adams' catalyst (or other noble metal hydrogenation catalyst of comparable activity). The reaction mixture is shaken in contact with a hydrogen atmosphere at a pressure of 50 pounds per square inch for 24 hours at about 25° C. The catalyst is removed by filtration, and the filtrate is brought to dryness by vaporization of the solvent under reduced pressure. Upon crystallization of the residue from a mixture of ether and methanol, there is obtained androstane-1β,3β,17β-triol melting at about 220–223° C. The structural formula is

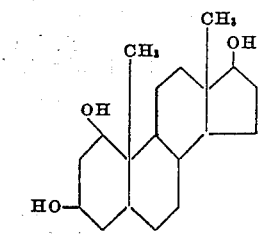

*Example 14*

A reaction mixture prepared from 3 parts of androstane-1α,3β,17β-triol, 50 parts of pyridine and 12 parts of acetic anhydride is heated at about 90–100° C. for 4 hours and then maintained at about 25° C. for an additional 48 hours. It is cautiously diluted with 10 parts of water, with external cooling, until the unreacted acetic anhydride is hydrolyzed. Dilution with water is then continued until separation of the insoluble reaction product is complete. The precipitated product is collected and washed with water. It is androstane-1α,3β,17β-triol triacetate. This compound exhibits infrared absorption maxima at about 5.74 and 8.0 microns. The structural formula is

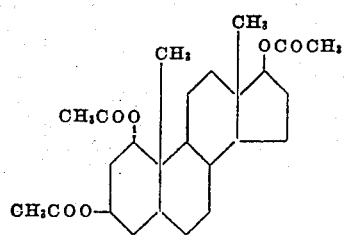

By the foregoing procedure, with the substitution of 3 parts of androstane-1β,3β,17β-triol for the androstane-1α,3β,17β-triol, and with the substitution of 14 parts of propionic anhydride for the acetic anhydride, the compound obtained is androstane-1β,3β,17β-triol tripropionate.

*Example 15*

To a solution of 3 parts of androstane-1α,3β,17β-triol in 50 parts of pyridine is added 10 parts of ethanesulfonyl chloride. The reaction mixture is allowed to stand at about 25° C. for 5 days, following which it is poured into several times its volume of ice water. The insoluble product is collected and washed with water. It is 1α,3β,17β-triethanesulfonoxyandrostane. This compound exhibits infrared absorption maxima at about 7.52 and 8.50 microns. The structural formula is

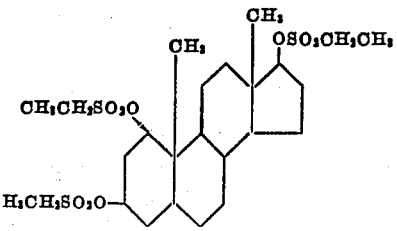

*Example 16*

By the procedure of Example 15, with the substitution of 6 parts of benzoyl chloride for the ethanesulfonyl chloride, the compound obtained is 1α,3β,17β-tribenzoyloxyandrostane.

Example 17

To a solution of 3 parts of androstane-1α,3β,17β-triol in 50 parts of pyridine is added 18 parts of β-cyclopentylpropionyl chloride. The exothermic reaction is moderated with an external cooling bath, and the mixture is then maintained at about 25° C. for 7 days. It is poured into several times its volume of ice water, and the insoluble product is washed by decantation with water and dissolved in ethyl acetate. The ethyl acetate solution is washed successively with diluted hydrochloric acid, with diluted potassium carbonate solution, and then with several portions of water. By concentration of the organic solution to dryness, there is obtained a residue of 1α,3β,17β-tricyclopentylpropionoxyandrostane.

Example 18

To a refluxing mixture of 6.5 parts of 1α,3β-dihydroxyandrostan-17-one in 450 parts of tetrahydrofuran is added a 3 molar solution of methylmagnesium bromide in butyl ether containing a total of about 36 parts of methylmagnesium bromide. The addition is carried out over a period of about 20 minutes, after which refluxing is continued for an additional 3 hours. Excess methylmagnesium bromide is decomposed by the addition of water to the cooled reaction mixture. The mixture is then chilled and partitioned between ether and an excess of saturated ammonium chloride solution. The separated ethereal phase is washed twice with saturated ammonium chloride solution and twice with water, after which is is rendered anhydrous, filtered and concentrated by vaporization of the solvents under reduced pressure. The product which remains can be crystallized from a mixture of ethyl acetate and petroleum ether, and is 17-methylandrostane-1α,3β,17β-triol which has a prominent infrared absorption maximum at about 2.9 microns but lacks significant infrared absorption in the wavelength range of 5.7–6.1 mcirons. The structural formula is

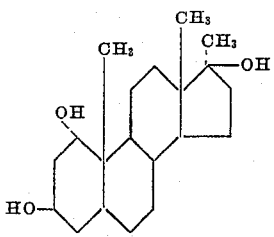

The same compound is obtained by the catalytic hydrogenation of 17-methyl-5-androstene-1α,3β,17β-triol according to the procedure of Example 2.

When, in the foregoing procedure, an equivalent quantity of ethylmagnesium bromide is substituted for the methylmagnesium bromide, the compound obtained is 17-ethylandrostane-1α,3β,17β-triol.

Example 19

To a refluxing solution of 1.25 parts of 1α,3β-dihydroxy-5-androsten-17-one in 90 parts of tetrahydrofuran there is added a solution of 2 parts of lithium aluminum hydride in 45 parts of tetrahydrofuran over a period of about 15 minutes. The reaction mixture is heated under reflux for an additional 20 minutes, after which it is cooled and treated in succession with 30 parts of ethyl acetate, 12 parts of ethanol and 10 parts of water. The mixture is then diluted with ether, and washed with two portions of 10% sodium hydroxide solution and with water. The separated organic phase is dried over anhydrous sodium sulfate, filtered, and concentrated to dryness by vaporization of the solvents. The nonvolatile residue is crystallized from a mixture of acetone and benzene to afford purified 5-androstene-1α,3β,17β-triol which, after thorough drying, melts at about 213–215° C. and has a specific rotation of about —54.8° in chloroform solution. The structural formula is

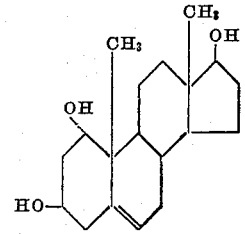

By the hydrogenation of 5-androsten-1α,3β,17β-triol according to the procedure of Example 2, the compound obtained is androstane-1α,3β,17β-triol, identical with the product of Example 10.

What is claimed is:

1. A compound of the structural formula

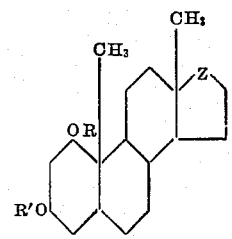

wherein R and R' are members of the class consisting of hydrogen and the acyl radicals of hydrocarbon carboxylic acids and hydrocarbon sulfonic acids having fewer than nine carbon atoms; and Z is a member of the class consisting of the carbonyl group, the hydroxymethylene group, groups of the formula CHO-acyl wherein the acyl radical is selected from among the acyl radicals of hydrocarbon carboxylic acids and hydrocarbon sulfonic acids having fewer than nine carbon atoms, and groups of the formula

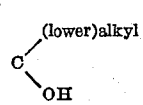

2. A compound of the structural formula

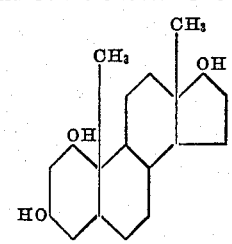

3. Androstane-1α,3β,17β-triol.
4. Androstane-1β,3β,17β-triol.
5. 1α,3β-dihydroxyandrostan-17-one.
6. A compound of the structural formula

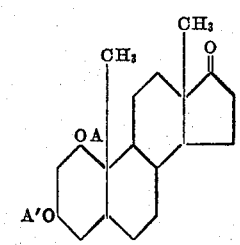

wherein A and A' are lower alkanoyl radicals.

7. 1α,3β-diacetoxyandrostan-17-one.

No references cited.